(12) United States Patent
Loebig

(10) Patent No.: US 6,381,327 B1
(45) Date of Patent: *Apr. 30, 2002

(54) METHOD FOR LINKING SUBSCRIBERS TO PLURAL COMMUNICATION NETWORKS

(75) Inventor: Norbert Loebig, Darmstadt (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,563

(22) Filed: May 28, 1997

(30) Foreign Application Priority Data

| May 28, 1996 | (DE) | 196 21 402 |
| Jul. 15, 1996 | (DE) | 196 28 458 |

(51) Int. Cl.⁷ .............................................. H04M 7/00
(52) U.S. Cl. .............................. 379/221.03; 379/221.02
(58) Field of Search ................................ 379/207, 227, 379/229, 230, 333, 334, 220.01, 221.01–221.14, 111, 112.01, 114.01, 114.06, 114.08, 121.01, 124

(56) References Cited

U.S. PATENT DOCUMENTS

| 4,565,903 A | * | 1/1986 | Riley | 379/220 |
| 4,866,763 A | * | 9/1989 | Cooper et al. | 379/221 |
| 5,430,719 A | * | 7/1995 | Weisser, Jr. | 370/389 |
| 5,430,794 A | * | 7/1995 | Ayame | 379/114 |
| 5,490,212 A | * | 2/1996 | Lautenschlager | 379/225 |
| 5,541,917 A | * | 7/1996 | Farris | 370/352 |
| 5,544,164 A | * | 8/1996 | Baran | 370/397 |
| 5,550,912 A | * | 8/1996 | Akinpelu et al. | 379/221 |
| 5,563,939 A | * | 10/1996 | La Porta et al. | 379/220 |
| 5,574,783 A | * | 11/1996 | Dunn | 379/230 |
| 5,592,477 A | * | 1/1997 | Farris et al. | 370/396 |
| 5,610,910 A | * | 3/1997 | Focsaneanu et al. | 370/351 |
| 5,668,857 A | * | 9/1997 | McHale | 379/93.07 |
| 5,673,255 A | * | 9/1997 | Dunn et al. | 370/244 |
| 5,712,908 A | * | 1/1998 | Brinkman et al. | 379/119 |
| 5,838,782 A | * | 11/1998 | Lindquist | 379/230 |
| 5,848,140 A | * | 12/1998 | Foladare et al. | 379/201 |
| 5,995,609 A | * | 11/1999 | Melnyk et al. | 379/207 |
| 5,995,618 A | * | 11/1999 | Bradley et al. | 379/333 |

FOREIGN PATENT DOCUMENTS

| DE | 43 29 056 A1 | 3/1995 |
| DE | 43 29 172 A1 | 3/1995 |

OTHER PUBLICATIONS

Harry Newton, Newton's Telecom Dictionary, 14th Ed., ISBN 1–57820–023–7, p. 303 Flow Control, Mar. 1998.*

* cited by examiner

Primary Examiner—Fan Tsang
Assistant Examiner—Roland G. Foster
(74) Attorney, Agent, or Firm—Schiff Hardin & Waite

(57) ABSTRACT

A method for permitting transparent handling of signal messages and voice information of a subscriber to a desired network operator through at least one local exchange of a network operator physically allocated to the subscriber.

1 Claim, 2 Drawing Sheets

METHOD FOR LINKING SUBSCRIBERS TO PLURAL COMMUNICATION NETWORKS

BACKGROUND OF THE INVENTION

1. Field of the Invention

The present invention pertains to communication networks, and in particular to method for linking subscribers to plural communication networks via a local exchange.

2. Discussion of the Related Art

Public network operators currently have an almost monopolistic position in the area of telephone communications, which they will lose with the deregulation of telecommunication markets. In the future, free competition will exist in such a way that individual telephone customers can select the provider he finds most attractive with respect to scope of services, fee structure, etc. With regard to telecommunication infrastructure in general, several public networks can exist alongside one another, comprising the classical network operators and as they have developed historically, and the new networks of the alternative and newly added network operators. Such competing public networks will consist of long distance carriers, local exchanges, and linked transmission paths. Competing network operators will be positioned to optimize the access to the local exchange. In addition, the local and long distance exchange function can be combined into single exchange using gateways between the various public networks. Thus, the accessibility of the subscribers of any network is assured for any additional network.

Such exchanges, particularly local exchanges, consist of peripheral installations formed either as terminal installations for subscribers or as subscriber terminal lines. Furthermore, central installations, field installations, signaling installations, such as Signaling System 7 (SS7), message buffers, computer platform, background memory, operator installations, and competing network operators are also provided. As a rule, all these installations are software-controlled single-processor or multiple-processor systems.

At present, the great majority of subscribers are still connected via subscriber interfaces to local exchanges, or to pre-positioned competing network operators associated with these exchanges provided by the network operator. In the latter case, the interface between the subscriber terminal concentrator and the local exchange is not standardized (e.g. by the ITU—International Telecommunication Union), but is a manufacturer-specific interface. Finally, subscriber terminal lines usually lead to the main distributor of the local exchanges of the network operator in a costly manner, such as via underground cabling.

In the past, for a subscriber connected to a public network operator and desiring access to an alternative network operator, the subscriber terminal line would have to be disconnected at the main distributor of the local exchange of the previous public network operator, and supplied to the local exchange of the desired network operator. However, the problem arises that a procedure of this sort can only be carried out for all subscribers associated with the interface, because such procedure for individual subscribers is not possible due to the fact that installation expenses are enormous.

SUMMARY OF THE INVENTION

It is an object of the invention to provide individual free access to local exchanges of all alternative network operators so that subscribers can be connected to a desired local exchange via manufacturer-specific interfaces in a technically flexible manner without a large installation expense.

It is another object of the invention to provide that subscriber voice and signaling messages can be switched to a competing network operator in transparent fashion by means of at least one local exchange of a physically allocated network operator so that no expensive or rigid access paths is needed in the region of the competing network operator. In addition, no overdimensioned access paths have to be made from the competing network operator to the local exchanges of alternative network operators. In addition, fluctuating access needs of the local exchanges of the competing network operators, which are subject to unforeseeable market conditions, can be flexibly adapted by administrative means.

It is a further object of the invention to provide that in the local exchange of one network operator, the physical address given to signaling messages is examined to see whether the subscriber is designated for switching to another network operator, such that branching to the local exchange of the other network operator can take place immediately and without expensive internal analysis.

It is an additional object of the invention to provide in a table of the local exchange of a network operator, a conversion carried out between a physical address valid between the subscriber and the local exchange of a physically allocated network operator, and an address under which signaling messages are sent to the interface via which the local exchange of at least one of the additional network operators can be reached. Therefore, distinct addresses can exist that can be coordinated and flexibly adapted to one another between the competing network operator and the local exchange.

It is yet another object of the invention to provide that packet data sent from or to a subscriber is conducted via a peripheral installation that terminates a packet data channel and transports the packet data to the interface between the local exchange of a physically allocated network operator and a local exchange having the switching-oriented function. Therefore, ISDN subscribers are supported with packet data authorization.

It is yet a further object of the invention to provide that in the case of failure situations or reavailability situations in a competing network operator, or at the interface at the subscriber side, the local exchange of the physically allocated network operator can send port-specific failure messages or availability messages to the associated local exchanges of the additional network operators for all subscribers concerned and at all relevant interfaces for this set of subscribers. In the case of failure situations or reavailability situations at the interface at the operator side, the local exchange carries port-specific failure indicators or availability indicators for all subscribers concerned, thereby avoiding switching-oriented dummy loading.

It is yet an additional object of the invention to provide that the plurality of subscribers reaches the local exchange of the physically allocated network operator via a plurality of competing network operators and/or via a plurality of interfaces. In addition, with respect to signaling information, voice information and packet data, is allocated to one or several interfaces of the local exchange of the additional network operator. Thus, subscribers allocated to the new network operator can be concentrated in the local exchange.

It is still another object of the invention to provide that at the local exchange of the physically allocated network operator there are several interfaces to a plurality of local exchanges of different additional network operators. Thus, an arbitrary number of additional network operators can be connected in the same way and at the same time, via the local exchange of the physically allocated network operator.

It is still a further object of the invention to provide that signaling and/or packet data are conducted to the plurality of subscribers already in the subscriber terminal concentrator, on fixed signaling channels and/or packet data channels reserved only for the subscribers allocated in switching terms to the additional network operator. The fixed signaling channels and/or packet data channels are connected as a totality, via an internal message buffer system of the local exchange or via voice channel through-switching through the local exchange, to a signaling data channel and/or packet data channel of the interface at the operator side. Thus, a need to evaluate addresses in the local exchange is omitted.

It is still an additional object of the invention to provide that the local exchange controls a traffic measurement in the sense of counting the number, duration of voice channel through-connections and/or number and length of transmitted packet data, and/or signaling messages between the plurality of subscribers and the additional network operator as a basis for cost accounting between the network operators. The network operator can thereby substantiate to the other network operators use of the resources of the local exchange, and can request appropriate payment.

It is another object of the invention to provide that the table of the local exchange can be administered by means of user intervention, in such a way that a subscriber can be allocated, in terms of switching. Thus, to the network operator or to one of the additional network operators the interface, as well as the allocated signaling data channels and/or packet data channels and the address valid at the interface, can be freely allocated. Therefore, the subscriber can change the network operator responsible for him in terms of switching through user actions, and in a short-term manner as desired. Rewiring or other installation expenses are thereby not required.

It is a further object of the invention to provide that a plurality of subscribers way include subscribers who are connected to the local exchange of the physically allocated network operator via standardized interfaces V5.1 according to ETSI 300324 and V5.2 according to 300327. The standardized interfaces serve as signaling protocols and switching interfaces at the digital exchange for support of access networks, and that the signaling information and packet data information thereof are converted in a suitable way in the local exchange. Thus, subscribers connected to the local exchange in newer technology according to the V5 standard can freely choose the network operator responsible for them in terms of switching.

These and other objects of the invention will become apparent after careful reading of the following detailed description of the presently preferred embodiments which are to be read in conjunction with a equally careful review of the accompanying drawing figures.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in which:

DETAILED DESCRIPTION OF THE PRESENTLY PREFERRED EMBODIMENTS

Figure 1:
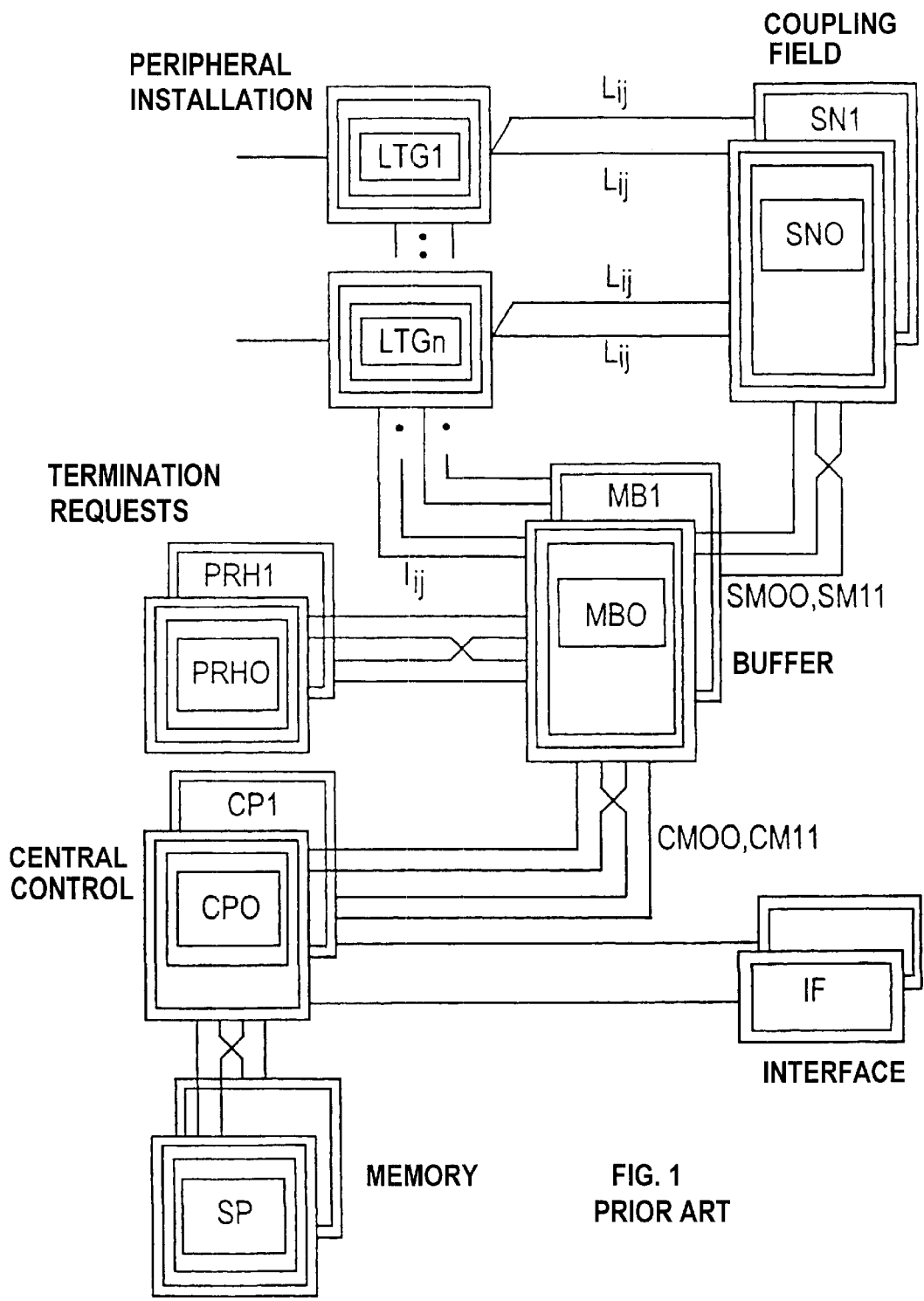
FIG. 1 shows the architecture of a typical communication system.

FIG. 1 shows the typical system architecture of a communication system with undoubted peripheral installations $LTG_1 \ldots LTG_n$. They are connected at the output side with subscribers or competing network operators and/or networks or, respectively, with additional communication systems. The items of information coming from these are received by the peripheral installations $LTG_1 \ldots LTG_n$ and are supplied to the redundantly constructed coupling field SN0, SN1 via connections $L_{ij}$.

Furthermore, $L_{ij}$, peripheral installations $LTG_1 \ldots LTG_n$ are connected, via additional connections $L_{ij}$, with the redundant message buffer units MB0, MB1, which in turn are connected, via additional connections $L_{ij}$, with, the installations for handling central protocol termination requests PRH (e.g. central character channel for SS7 signaling and access to packet networks), with the coupling fields SN0, SN1, and with redundant control means CP0, CP1. The latter is connected to a doubled mass memory SP. Furthermore, interface units IF are provided at the central control means CP0, CP1 for connecting user elements for alerting maintenance personnel. The coupling field SN0, SN1, the message buffer units MB0, MB1, the means for handling central protocol termination requests PRH0, PRH1, the central control means CP0, CP1 the mass memory SP, and the interface units IF are all provided in redundant form in the communication system. In contrast, the peripheral installations $LTG_1 \ldots LTG_n$ are constructed in non-redundant form.

Figure 2:
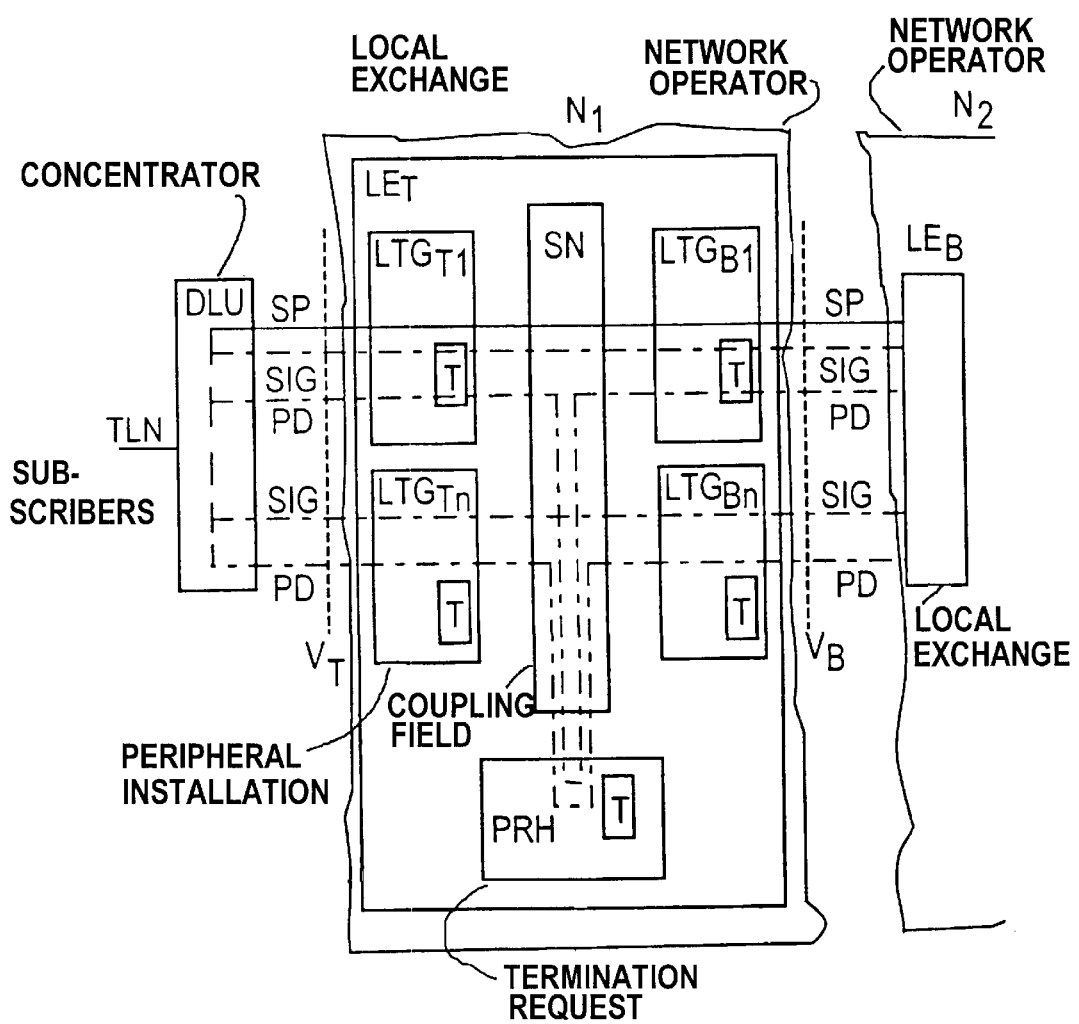
FIG. 2 shows a communication system according to the present invention.

FIG. 2 shows a telephone system using the method of the present invention, involving a local exchange $LE_T$ of a first network operator N1. For clarity, only one local exchange is shown, although the entire network for which the network operator N1 is responsible comprises a plurality of local exchanges of this type, as well as additional exchanges, such as long distance exchanges. Subscribers TLN are physically allocated to the local exchange $LE_T$, by connection to the local exchange $LE_T$, via a competing network operator DLU. The competing network operator DLU and the local exchange $LE_T$ are connected via a proprietary manufacturer-specific interface $V_T$. The interface of the competing network operator to the local exchange is a concentrating interface characterized by two signaling channels (CCS channels) operated in a load sharing mode, and two D-channel packet data channels, likewise operated in load sharing mode. Given A-side occupation, circuit-switched connections and packet data connections can be carried randomly, and, given B-side occupation, can be carried optionally, according to load considerations, via two peripheral installations. The peripheral installations are operatively connected with the termination request unit PRH via the coupling field SN.

A second network operator N2 can be seen in FIG. 2. The second network operator N2 is connected according to the method of the present invention to the local exchange $LE_T$ via a further competing network operator interface $V_B$. This interface is a proprietary manufacturer-specific interface, and in the present embodiment is identical with respect to operation and design, to the interface $V_T$ at the subscriber side. Additional network operators, not shown in FIG. 2, can be connected via additional interfaces constructed in this way. Subscribers TLN that wish to be served by the network operator N2 are thus allocated physically to the network operator N1 and in terms of switching to the network operator N2.

The method of the present invention will now be discussed by assuming that one of the subscribers TLN wishes to communicate with another subscriber. The subscriber TLN is physically connected directly to the local exchange $LE_T$ of the network operator N1 via a responsible interface $V_T$ at the subscriber side. Since in terms of switching the subscriber TLN is allocated to the network operator N2, operator N2 provides necessary switching-oriented functions, services and features in the relevant local exchange $LE_B$. For better comprehensibility, peripheral installations $LTG_1 \ldots LTG_n$ are designated as subscriber-side peripheral installations $LTG_{T1} \ldots LTG_{Tn}$, and as operator-side peripheral installations $LTG_{B1} \ldots LTG_{Bn}$.

Signaling messages SIG of the subscriber TLN are preprocessed in one of the peripheral installations by access to the competing network operator DLU, which for example, may be peripheral installation $LTG_{T1}$. In addition, signaling messages SIG enter the local exchange $LE_T$ via one of the two signaling-channels (CCS channels).

Each of the signaling messages SIG is provided with a port number EQN of the subscriber TLN. This is the physical address under which subscriber TLN is connected in the competing network operator DLU (shelf module port). On the basis of the port number EQN, the functional (switching-oriented) association of the subscriber TLN is recognized at the local exchange $LE_B$.

A data table T is maintained in the local exchange $LE_T$. With the data stored in the table, the port number EQN at the interface $V_T$ of the competing network operator DLU of the subscriber TLN is converted into a port number EQN at the $V_B$ interface, as well as the number of the $V_B$ interface. A signaling channel for signaling the subscriber TLN to interface $V_B$ is fixed according to a determined criterion. As described above, random viewpoints and/or load viewpoints can thereby be used as a criterion. In contrast to the port number of the $V_T$ interface, the port number EQN of the $V_B$ interface is a virtual port number and has no physical relation. The virtual port number permits the $LE_B$ to handle signaling and packet data of the subscriber TLN in the same manner as a subscriber connected directly to an already existing competing network operator DLU of the $LE_B$.

The signaling message from the subscriber TLN is then forwarded, via the internal message buffer system MB of the local exchange $LE_T$, to the peripheral installation that terminates the signaling channel of the $V_B$ interface. In the peripheral installation, the signaling message SIG having the port number EQN valid for subscribers TLN on the $V_B$ interface, is sent to the local exchange $LE_B$.

Signaling messages sent from the local exchange $LE_B$ to the subscriber TLN are recognized in one of the peripheral installations of the local exchange $LE_T$ (e.g., in the peripheral installations $LTG_{B1}$) by their port number EQN of the $V_B$ interface. By means of table T, which is to be maintained administratively in the local exchange $LE_T$, the virtual port number EQN of the subscriber TLN at the $V_B$ interface is converted into a physical port number EQN of the $V_T$ interface, as well as the number of the $V_T$ interface. Here, according to a determining criterion, a signaling channel is fixed for the signaling of the subscriber TLN of the interface $V_T$ at the subscriber side. Random or load points of view are also as a criterion.

Signaling message SIG received from the local exchange $LE_B$ is then forwarded via the internal message buffer system MB of the local exchange $LE_T$ to the peripheral installation terminating the signaling channel of the $V_T$ interface. In this peripheral installation, the signaling message with the physical port number EQN valid for the subscriber TLN at the subscriber-side interface $V_T$ is then forwarded in the direction of the competing network operator DLU.

According to the definition of the subscriber-specific interface, signaling channels (CCS channels) at the interfaces $V_T$ and $V_B$, for subscriber TLN, are used for all signaling messages SIG in both directions of transmission of a connection. It is then necessary only to carry out random or load-dependent selection of the signaling channel during each connection setup. In the simplest case, allocation to the subscriber TLN can take place in a fixed manner by default assignment. In the alternative peripheral installations LTG of the local exchange $LE_T$ must check signaling messages SIG between subscriberTLN and local exchange $LE_B$ for connection setup (SEIZURE) and connection dismantling (RELEASE) in orderto find the trigger point for a connection-related new allocation of TLN signaling messages and signaling channel (CCS channel).

Temporary through-connections of voice channels SP through the local exchange $LE_T$ are also required. For this purpose, allocation of a voice channel SP to the subscriber TLN must be controlled in the local exchange $LE_T$. Arbitrary free voice channel of the interface $V_T$ is allocated to the subscriber TLN only for the duration of the connection. Therefore, in the competing network operator DLU, a temporary through-connection of the subscriber to the allocated voice channel SP of the interface $V_T$ is established. However, separate protocol through-connect requests of the local exchange $LE_B$ to the competing network operator DLU, similar to the BCC protocol of the V5.2 interface, are not available. Thus, the local exchange $LE_T$ must derive trigger points for through-connection of voice channel SP through the local exchange $LE_T$ and the release of the voice channel SP from switching-oriented messages between local exchange $LE_B$ and the competing network operator DLU.

This can be done if allocation of the subscriber TLN to the voice channel SP of the $V_B$ interface between the local exchanges $LE_T$, then $LE_B$ is requested by the local exchange $LE_B$ and communicated by the local exchange $LE_B$ to the competing network operator DLU. The competing network operator DLU appears to be virtual (non-existent) to the $V_B$ interface. Virtual (non-existent) competing network operator exists in the $LE_T$, in the form of a switching-oriented message related to the interface $V_B$ (TIME SLOT ASSIGN).

Local exchange $LE_T$ makes a through-connection of the voice channel of interface $V_B$ to a free voice channel of interface $V_T$. Furthermore, a switching-oriented message received from $LE_B$ relating to the interface $V_B$ is converted at the interface $V_T$ by the local exchange $LE_T$. Access to table T is in turn required for the conversion of the port number EQN in the local exchange $LE_T$. This converted message is then handed to the real competing network operator DLU. Upon receipt of an execution acknowledgment from the competing network operator DLU, the request is acknowledged at the local exchange $LE_B$ as having been executed.

In case of failure, a rejection of the through-connect request of the local exchange $LE_B$, or non-acknowledgment is provided.

During the connection set-up the local exchange $LE_B$ communicates to the seemingly virtual (non-existent) competing network operator DLU, whether the local exchange $LE_B$ requests release of the voice channel of the subscriber TLN at the interface $V_B$. Virtual (non-existent) competing network operator (DLU) exists in the $LE_T$ in the form of a switching-oriented message relating to the interface $V_B$ (TIME SLOT RELEASE).

Local exchange $LE_T$ cancels through-connection of the previously allocated voice channel of the interface $V_T$ and converts the switching-oriented message to the interface $V_T$, which relates to the interface $V_B$ with regard to EQN and voice channels. Access to the table T is required for converting the port number EQN in the local exchange $LE_T$. The converted port number EQN is then handed on to the real competing network operator DLU, and, with the receipt of the execution acknowledgment from same, the request is acknowledged at the local exchange $LE_B$ as executed.

In the following, handling of D-channel packet data sent to the local exchange $LE_B$ by one of the subscribers TLN is discussed in more detail. Of course, this holds only for subscribers TLN to whom ISDN function with packet data authorization has been assigned.

The packet data of a packet data connection of the subscriber TLN are transmitted in one of two available packet data channels of the interface $V_T$ to a central protocol handler PRH of the local exchange $LE_T$, which protocol handler realizes the packet network access, the transmission ensuing in transparent fashion via one of the peripheral installations LTG. Packet data of a packet data connection to the subscriber TLN is recognized at the interface $V_T$ by the port number EQN of the subscriber TLN, which is coded in the message header. By means of the table T, which is maintained administratively in the local exchange $LE_T$, the physical port number EQN of the subscriber TLN at the interface $V_T$, coded in the message header, is converted to the coded virtual port number EQN of the subscriber TLN at the interface $V_B$. The converted message is then sent to the port of the central protocol handler PRH, which permits forwarding of the packet data message to a selected one of two packet data channels of the interface $V_B$ in the direction of the local exchange $LE_B$. The selected packet data channel is set for all messages of the packet data connection. In the alternative, the packet data received from the subscriber TLN is conducted not in the direction of the packet network, but to a packet data channel of the interface $V_B$. For this purpose, a frame switching is carried out in the local exchange $LE_T$.

Analogously, the packet data of a packet data connection of the subscriber TLN sent from the local exchange $LE_B$ to the local exchange $LE_T$ is transmitted in transparent fashion in one of two available packet data channels of the interface $V_B$, via one of the peripheral installations LTG, to a central protocol handler PRH of the local exchange $LE_T$. They are recognized at the interface $V_B$ by the virtual port number EQN of the subscriber TLN, coded in the message header. By means of table T, the virtual port number EQN of the subscriber TLN at the interface $V_B$, is converted to the coded physical port number EQN of the subscriber TLN at the interface $V_T$. The converted message is sent to the port of the central protocol handler PRH, which permits forwarding of the packet data message to a selected one of the two packet data channels of the interface $V_T$ in the direction of the local exchange $LE_B$. The selected packet data channel is fixed for all messages of a packet data connection. In order to provide this function, frame switching is executed in the local exchange $LE_T$. This, control of layer 1 by ISDN subscribers TLN is conducted in the competing network operator DLU without direct control by the local exchange $LE_T$.

In the case of failure situations or reavailability situations in the competing network operator DLU or at interface $V_B$, local exchange $V_T$ generate s port-specific failure messages and availability messages to the associated local exchange $LE_B$ for all subscribers TLN concerned and at all interfaces $V_B$ relevant for this set of subscribers. Multiple access to table T is required for conversion of the relevant port number EQN in the local exchange $LE_T$. In case of failure situations and reavailability situations at the interface $V_B$, local exchange $LE_T$ maintains items of port-specific state information for all subscribers TLN concerned, which are evaluated in the local exchange $LE_T$ in terms of the connection setup, such that connection setup is not carried out for an unavailable subscriber TLN. Multiple access to the table T is required for conversion of the relevant port number EQN in the local exchange $LE_B$.

If one of the subscribers TLN wishes to become a customer of a different public network operator, he is administratively blocked in the local exchange $LE_B$, and is thereby temporarily deactivated in the competing network operator DLU and permanently deactivated in the previous local exchange.

In a new local exchange $LE_B$, the subscriber can instantly be installed and allocated a port number EQN. The port number EQN entered in the table T of the local exchange $LE_T$, together with the associated manufacturer-specific interface. The subscriber is then permanently unblocked in the new local exchange $LE_B$. Other procedures are also possible according to the method of the present invention. However, it is essential that the subscriber TLN is flexibly allocated to another network operator by means of administrative transcription of entries in table T of the local exchange $LE_T$.

Additional expansion possibilities include, for example, implementation of fixed through-connections of channels for signaling and/or D-channel packet data. Such channels are reserved for particular alternate network operators, to channels of an interface between the local exchanges $LE_T$ and $LE_B$.

In addition, separate packet network access to packet networks of competing network operators can be provided in the local exchange $LE_T$, as well as traffic measurements and metering of calls and P-calls as a basis for accounting of the public network operators among one another.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for linking subscribers to communication systems of different network operators, comprising the steps of:

physically allocating a plurality of subscribers to a first network operator and to at least one additional network operator, via manufacturer-specific interfaces; and handing through signaling messages and items of speech information of the subscriber allocated in terms of switching to the additional network operator to a local exchange of the at least one additional network operator through the at least one local exchange of the physically allocated first network operator and without evaluating or processing said signaling messages or items of speech information at said first network operator beyond an examination of a physical address and during a connection time, the connection time being a time period after a connection setup and before the connection dismantling;

wherein for failure situations and availability situations in a subscriber terminal concentrator or at an interface at a subscriber side, the local exchange of the subscriber generates port-specific failure messages and availability messages to associated local exchanges for all other subscribers concerned, at all interfaces relevant for this set of subscribers, and wherein for failure situations and availability situations at an interface at the operator side, the local exchange of the subscribers carries port-specific failure indicators and availability indicators for all other subscribers concerned, which indicators are evaluated in terms of switching in a connection setup.

* * * * *